United States Patent
Schubert et al.

(10) Patent No.: US 7,556,673 B2
(45) Date of Patent: Jul. 7, 2009

(54) METHOD FOR THE SEPARATION OF CARBON DIOXIDE USING A POROUS METAL-ORGANIC FRAMEWORK MATERIAL

(75) Inventors: Markus Schubert, Ludwigshafen (DE); Ulrich Müller, Neustadt (DE); Christoph Kiener, Weisenheim am Sand (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 406 days.

(21) Appl. No.: 11/563,101

(22) Filed: Nov. 24, 2006

(65) Prior Publication Data

US 2008/0121105 A1 May 29, 2008

(51) Int. Cl.
*B01D 53/04* (2006.01)
(52) U.S. Cl. .......................................... 95/139; 423/230
(58) Field of Classification Search ................... 95/139, 95/96, 148, 900; 423/220, 230
See application file for complete search history.

(56) References Cited

U.S. PATENT DOCUMENTS

| | | | | |
|---|---|---|---|---|
| 5,648,508 A | * | 7/1997 | Yaghi | 556/9 |
| 6,491,740 B1 | * | 12/2002 | Wang et al. | 95/90 |
| 2005/0124819 A1 | * | 6/2005 | Yaghi et al. | 556/148 |

FOREIGN PATENT DOCUMENTS

EP  1 070 538 A2  1/2001

OTHER PUBLICATIONS

A.R. Millwar and Omar M. Yaghi, "Metal-Organic Frameworks with Exceptionally High Capacity of Storage of Carbon Dioxide at Room Temperature", J.Am.Chem.Soc. 2005, 127, pp. 17998-17999.

B. Arstad et al., "International Symposium on Zeolithes and Microporous Crystals" (ZMPC2006), Jul. 30, 2006 to Aug. 2, 2006, Yonago, Japan.

* cited by examiner

*Primary Examiner*—Frank M Lawrence
(74) *Attorney, Agent, or Firm*—Oblon, Spivak, McClelland, Maier & Neustadt, P.C.

(57) ABSTRACT

The present invention relates to a method for the separation of carbon dioxide from a gas mixture containing carbon dioxide comprising the steps of (a) contacting the gas mixture with at least one sorbent comprising a porous metal-organic framework material, the framework material taking up the carbon dioxide from the gas mixture and comprising at least one at least bidentate organic compound coordinately bound to at least one metal ion, wherein the at least bidentate organic compound comprises at least one substituted or unsubstituted amino group and wherein the at last one metal ion is an ion selected from the group of metals consisting of magnesium, calcium, strontium, barium, aluminium, gallium, indium, scandium, yttrium, titanium, zirconium, iron, copper and lanthanoids; and (b) desorbing the carbon dioxide.

20 Claims, 3 Drawing Sheets

METHOD FOR THE SEPARATION OF CARBON DIOXIDE USING A POROUS METAL-ORGANIC FRAMEWORK MATERIAL

The present invention relates to a method for the separation of carbon dioxide from gas mixtures containing carbon dioxide.

Carbon dioxide is the component of many gas mixtures including natural gases, fuel gases, waste gases and air. Depending on the desired use of such gas mixtures carbon dioxide may be considered as a by-product to be separated. One example is the production of unsaturated hydrocarbons in, e.g., steam cracking processes, reforming processes and coal gasification where carbon dioxide is included in the product stream. Another example is the separation of carbon dioxide for its deposition, e.g., subterraneous for the reduction of $CO_2$-emission.

Thus, there is a need to separate carbon dioxide from gas mixtures.

Conventional methods for the separation of carbon dioxide include the use of an amino solution as absorbent.

However, another sorbent described in the literature includes metal-organic framework materials as sorbent.

A. R. Millward et al., J. Am. Chem. Soc. 127 (2005), 17998-17999, describe the high capacity of certain metal-organic framework materials for the storage of carbon dioxide at room temperature. Carbon dioxide adsorption isotherms for several metal-organic framework materials are shown in comparison to conventional sorbent materials like zeolithes.

Further carbon dioxide adsorption isotherms for metal-organic framework materials were shown by B. Arstad et al. on the international symposium on zeolithes and microporous crystals (ZNPC 2006), which was held during July 30 to Aug. 2, 2006 in Yonago, JP.

However, since the prerequisites and conditions for the storage and the separation of a compound are totally different, the ability to store a pure compound by a sorbent material does not necessarily qualify a material as good separation medium.

The ability of using copper (II) benzene-1,3,5-tricarboxylate as metal-organic framework material is described in EP-A 1070538.

Even though metal-organic framework materials are described for the use of separating carbon dioxide from carbon dioxide containing gas mixtures there is need to provide further sorbent materials which are efficient for the separation of carbon dioxide.

Thus, an object of the present invention is to provide metal-organic framework materials for the separation of carbon dioxide.

Figure 1:
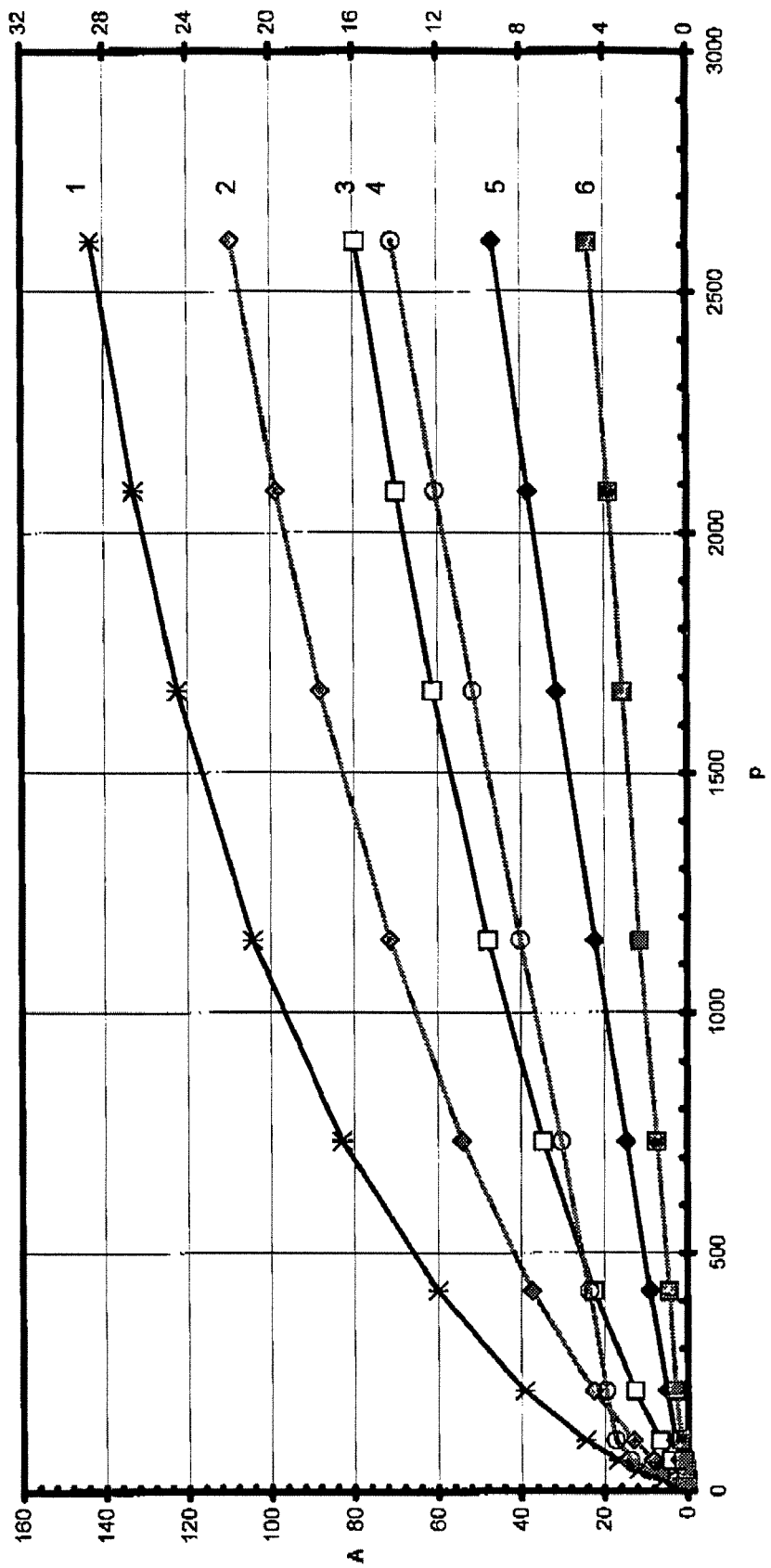
FIG. 1: isotherms of carbon dioxide in comparison with carbon monoxide.

The object is achieved by a method for the separation of carbon dioxide from a gas mixture containing carbon dioxide comprising the steps of (a) contacting the gas mixture with at least one sorbent comprising a porous metal-organic framework material, the framework material taking up the carbon dioxide from the gas mixture and comprising at least one at least bidentate organic compound coordinately bound to at least one metal ion, wherein the at least bidentate organic compound comprises at least one substituted or unsubstituted amino group and wherein the at last one metal ion is an ion selected from the group of metals consisting of magnesium, calcium, strontium, barium, aluminium, gallium, indium, scandium, yttrium, titanium, zirconium, iron, copper, and lanthanoids; and (b) desorbing the carbon dioxide.

Surprisingly it was found, that metal-organic framework materials which comprise amino group substituted organic ligands coordinately bound to the aforementioned metals are very suitable for the separation of carbon dioxide from gas mixtures containing carbon dioxide.

The gas mixture containing carbon dioxide used in the method for the separation of carbon dioxide according to the present invention originates from a natural or artificial source. In principle, all gas mixtures are suitable where carbon dioxide is contained as long as the contacting of said gas mixtures with the porous metal-organic framework material yields in the separation of carbon dioxide from the gas mixture.

Preferably the gas mixture contains in addition to carbon dioxide at least one gas selected from the group consisting of methane, ethane, n-butane, i-butane, hydrogen, carbon monoxide, ethene, ethyne, propene, nitrogen, oxygen, helium, neon, argon, krypton, and hydrogen sulfide.

As a further preferred embodiment of the present invention the gas mixture contains at least two additional gases, preferably selected from the aforementioned group.

Thus the gas mixture can contain carbon dioxide and at least one or two or more different gases. It is also possible that the gas mixture contains 3, 4, 5, 6, 7, 8, 9 or 10 additional gases. The gas mixture may have quite more different gases so that a complex gas mixture is used. The different constituents of the gas mixture may have different proportions. There may be main components and constituents which are only included in trace amounts.

Preferably the amount of carbon dioxide in the gas mixture is at least 1%. More preferred is a carbon dioxide amount of at least 5%. Most preferred are amounts in the gas mixture of at least 10%. Preferably, the amount of carbon dioxide in the gas mixture is less than 60%, more preferred less than 45%.

The gas mixture is preferably selected from the group consisting of natural gas, fuel gas, bio gas, town gas, waste gas, flue gas, and air.

The contacting of the gas mixture is preferably carried out by continuous adsorption on a fixed bed. In this case the gas mixture is passed through the sorption bed. More preferred the continuous adsorption takes place in one or more shaft or tubular reactors, in particular in at least two shaft reactors, at least one reactor being filled with a sorbent which comprises the porous metal-organic framework material. Reactor cascades are likewise conceivable. A reactor can comprise a part-filling with porous metal-organic framework material or a combined bed for example having additional other adsorbents.

The inventive method is carried out at a pressure which is preferably in the range from 0.1 bar to 325 bar (absolute).

The partial pressure of carbon dioxide in the gas mixture is preferably from 0.1 to 20 bar. More preferred the partial pressure of carbon dioxide is from 0.2 to 10 bar and even more preferred from 0.5 to 5 bar (absolute) and in particular from 0.8 to 2 bar. Preferably, the absolute pressure of the gas mixture is more than 1 bar, more preferred more than 2 bar. Preferably the absolute pressure is less than 30 bar, more preferred less than 15 bar.

The temperature in step (a) is preferably in the range from 0° C. to 100° C., preferably from 10 to 60° C., more preferred from 20 to 50° C. and in particular between 20 and 40° C. Furthermore, it is preferred that the adsorption is carried out without external heating or cooling.

The temperature for the desorption in step (b) is preferably less than 100° C. and more preferred less than 60° C. Furthermore, it is preferred that the desorption is carried out without external heating or cooling.

The gas mixture is preferably contacted with the at least one sorbent at a gas hourly space velocity (GHSV) of 50 l (S.T.P.)/h to 50,000 l (S.T.P.)/h.

The gas mixture can be contacted with the at least one sorbent comprising a porous metal-organic framework material once or repeatedly.

The carbon dioxide which is separated from the gas mixture and situated on the adsorbent can be desorbed by methods well known in the art. One possibility is to desorb the carbon dioxide by means of nitrogen purge gas under conditions in which the separation (enrichment) is also carried out. Alternatively, other gases could be used if, for example, the carbon dioxide is later to be used in the form of a mixture with the other gas or gases.

There are further possibilities for the desorption without additional purge gas by means of pressure swing adsorption (PSA) or temperature swing adsorption (TSA) or both. Within the meaning of the present invention the term pressure swing adsorption does also include vacuum pressure swing adsorption (VPSA).

Preferably, desorption takes place with pressure swing adsorption. The manner in which desorption can be carried out is known to the person skilled in the art. Instructions for this are found, for example, in Werner Kast "Adsorption aus der Gasphase", Verlag VCH, Weinheim (Germany), 1988.

In general, suitable pressures are from 50 mbar to 3 bar (absolute), preferably from 100 mbar to 1.5 bar, in particular atmosphere pressure. Preferably, the gas mixture is subject to dehumidification before it is contacted with the at least one sorbent in step (a) according to the method of the present invention.

The dehumidification can be carried out using conventional sorption materials or other methods.

Preferably, the dehumidification is carried out by adsorption over fixed bed reactors containing solid sorbents. Preferred solid sorbents are molecular sieves, silica gels or aluminas. Larger amounts of water can be removed by freezing out in a previous step.

In a preferred embodiment the dehumidification is carried out in that after said step the gas mixture has a water content of less than 2,000 ppm. Preferably content of water after dehumidification is less than 1,000 ppm, even more preferred less than 300 ppm and in particular less than 100 ppm.

The gas mixture is contacted with at least one sorbent in step (a) of the method for the separation of carbon dioxide according to the present invention. There is the possibility to use one sorbent or more than one sorbent for example sorbent beds as described above. In case there are more than one sorbent these sorbents can be the same or different.

At least one of these sorbents in case there are more than one sorbent or in case there is one sorbent this sorbent comprises the porous metal-organic framework material. Additional materials can also be present which can also be used as a sorbent for carbon dioxide or not.

At least the porous metal-organic framework material takes the carbon dioxide up from the gas mixture.

The metal-organic framework material comprises at least one at least bidentate organic compound coordinately bound to at least one metal ion.

The metal-organic framework material used in the method for the separation of carbon dioxide according to the present invention can be prepared by methods well known for the preparation of porous metal-organic framework materials known in the art.

Metal-organic framework materials and their preparation are described, for example, in U.S. Pat. No. 5,648,508, EP-A 790253, M. O'Keeffe et al., J. Sol. State Chem. 152 (2000), 3-20; H. Li et al., Nature 402 (1999), 276; M. Eddaoudi et al., Topics in Catalysis 9 (1999), 105-111; B. Chen et al., Science 291 (2001), 1021-1023 and DE-A 10111230.

The metal-organic framework material used in the method for the separation of carbon dioxide according to the present invention comprises pores, in particular micropores and/or mesopores. Micropores are defined as those having a diameter of 2 nm or less and mesopores are defined by a diameter in a range from 2 to 50 nm, in each case in accordance with a definition as specified by Pure and Appl. Chem. 57 (1985), 603-619, in particular on page 606. The presence of micropores and/or mesapores can be studied using sorption measurements, these measurements determining the uptake capacity of the metal-organic framework material for nitrogen at 77 K as specified in DIN 66131 and/or DIN 66134.

Preferably, the specific surface area, calculated according to the Langmuir model (DIN 66131, 66134) for a metal-organic framework material used in the method for the separation of carbon-dioxide according to the present invention in powder form is at least 450 $m^2/g$ determined according to Langmuir with nitrogen at 77 K.

More preferred the specific surface is at least 900 $m^2/g$.

Shaped bodies from the metal-organic framework material used in the method for the separation of carbon dioxide according to the present invention can have a lower specific surface area. Preferably it is at least 250 $m^2/g$ determined according to Langmuir with nitrogen at 77 K. Preferably the specific surface area is at least 300 $m^2/g$.

In addition to the conventional methods for the preparation of the metal-organic framework material used in the method for the separation of carbon dioxide according to the present invention (e.g. in U.S. Pat. No. 5,648,508), they can also be produced in an electrochemical method. In this respect, reference is made to DE-A10355087.

Independently of its production, the resultant metal-organic framework material is produced in powder or crystalline form. This can be used as such as sorbent in the inventive method alone or together with other sorbents or other materials. Preferably, this is performed as bulk, in particular in a fixed bed. In addition, the framework material can be converted into a shaped body. Preferred methods in this case are rod extrusion or tableting. In the production of shaped bodies, further materials, for example binders, lubricants or other additives, can be added to the framework material. Likewise, it is conceivable that mixtures of metal-organic framework materials and other adsorbents, for example activated carbon, are produced as shaped bodies, or separately result in shaped bodies which are then used as shaped body mixtures.

Essentially no restrictions exist with respect to the possible geometries of these MOFs. For example, those which may be mentioned are, inter alia, pellets, for example disk-shaped pellets, pills, beads, granules, extrudates, for example rods, honeycombs, meshes or hollow bodies.

For production of these shaped bodies, in principle all suitable methods are possible. In particular, preference is given to the following procedures:

Kneading the framework material alone or together with at least one binder and/or at least one pasting agent and/or at least one template compound to obtain a mixture; shaping the resultant mixture by means of at least one suitable method, for example extrusion; optionally washing and/or drying and/or calcining the extrudate; optionally final processing.

Applying the framework material to at least one if appropriate porous support material. The resultant material can then be further processed in accordance with the above-described method to give a shaped body.

Applying the framework material to at least one if appropriate porous substrate.

Kneading and shaping can be performed according to any suitable method, as described, for example, in Ullmanns Enzyklopädie der Technischen Chemie [Ullmann's Encyclopedia of Industrial Chemistry], 4th edition, Volume 2, pp. 313 ff. (1972), the content of which in this respect is incorporated in its entirety by reference into the context of the present application.

For example, preferably, the kneading and/or shaping can be performed by means of a piston press, roller press in the presence or absence of at least one binder material, compounding, pelleting, tableting, extruding, co-extruding, foaming, spinning, coating, granulating, preferably spray-granulating, spraying, spray-drying or a combination of two or more of these methods.

Very particularly, pellets and/or tablets are produced.

The kneading and/or shaping can be performed at elevated temperatures, such as, for example, in the range from room temperature to 300° C., and/or at elevated pressure, such as, for example, in the range from atmospheric pressure up to some hundred bar and/or in a protective gas atmosphere, such as, for example, in the presence of at least one noble gas, nitrogen or a mixture of two or more thereof.

The kneading and/or shaping, according to a further embodiment, is carried out with the addition of at least one binder, as binder, use being able to be made in principle of any chemical compound which imparts the viscosity of the mass to be kneaded and/or shaped desired for the kneading and/or shaping. Therefore, binders, in the context of the present invention, can be both viscosity-increasing, and viscosity-decreasing, compounds.

As binders preferred, inter alia, mention may be made of, for example, aluminum oxide or aluminum-oxide-comprising binders, as are described, for example, in WO 94/29408, silicon dioxide, as described, for example, in EP 0 592 050 A1, mixtures of silicon dioxide and aluminum oxide, as are described, for example, in WO 94/13584, clay minerals, as are described, for example, in JP 03-037156 A, for example montmorillonite, kaolin, bentonite, hallosite, dickite, nacrite and anauxite, alkoxysilanes, as are described, for example, in EP 0 102 544 B1, for example tetraalkoxysilanes, for example tetramethoxysilane, tetraethoxysilane, tetrapropoxysilane, tetrabutoxysilane, or, for example, trialkoxysilanes, for example trimethoxysilane, triethoxysilane, tripropoxysilane, tributoxysilane, alkoxytitanates, for example tetraalkoxytitanates, for example tetramethoxytitanate, tetraethoxytitanate, tetrapropoxytitanate, tetrabutoxytitanate, or, for example, trialkoxytitanates, for example trimethoxytitanate, triethoxytitanate, tripropoxytitanate, tributoxytitanate, alkoxyzirconates, for example tetraalkoxyzirconates, for example tetramethoxyzirconate, tetraethoxyzirconate, tetrapropoxyzirconate, tetrabutoxyzirconate, or, for example, trialkoxyzirconates, for example trimethoxyzirconate, triethoxyzirconate, tripropoxyzirconate, tributoxyzirconate, silica sols, amphiphilic substances and/or graphites. In particular, preference is given to graphite.

As viscosity-increasing compound, use can also be made of, for example, if appropriate in addition to the abovementioned compounds, an organic compound and/or a hydrophilic polymer, for example cellulose or a cellulose derivative, for example methylcellulose and/or a polyacrylate and/or a polymethacrylate and/or a poly(vinyl alcohol) and/or a polyvinylpyrrolidone and/or a polyisobutene and/or a polytetrahydrofuran.

As pasting agents, use can be made of, inter alia, preferably water or at least one alcohol, for example a monoalcohol having 1 to 4 carbon atoms, for example methanol, ethanol, n-propanol, isopropanol, 1-butanol, 2-butanol, 2-methyl-1-propanol or 2-methyl-2-propanol or a mixture of water and at least one of said alcohols or a polyhydric alcohol, for example a glycol, preferably a water-miscible polyhydric alcohol, alone or as a mixture with water and/or at least one of said monohydric alcohols.

Further additives which can be used for kneading and/or shaping are, inter alia, amines or amine derivatives, for example tetraalkylammonium compounds or amino alcohols and carbonate-comprising compounds, for instance calcium carbonate. Such further additives are described, for instance, in EP 0 389 041 A1, EP 0 200 260 A1, or WO 95/19222.

The sequence of the additives such as template compound, binder, pasting agent, viscosity-increasing substance, in the shaping and kneading is in principle not critical.

The metal-organic framework material used in the method for the separation of carbon dioxide according to the present invention may have a polymer structure. However, it is also possible to produce "capped" framework materials. In this regard reference is made to A. C. Sudik et al., J. Am. Chem. Soc. 127 (2005), 7110-7118. These compounds are called metal-organic polyhedra (MOP).

The metal-organic framework material used in the method for the separation of carbon dioxide according to the present invention comprises at least one at least bidentate organic compound co-ordinately bound to at least one metal ion.

The at least one metal ion is an ion selected from the group of metals consisting of magnesium, calcium, strontium, barium, aluminium, gallium, indium, scandium, yttrium, titanium, zirconium, iron, copper, and lanthanoids.

Lanthanoids are metals of the group consisting of La, Ce, Pr, Nd, Pm, Sm, Eu, Gd, Tb, Dy, Ho, Er, Tm, and Yb.

More preferred metals are those selected from the group consisting of magnesium, calcium, aluminium, indium, yttrium, lanthanum, cerium, and zirconium.

Even more preferred are aluminium and zirconium, in particular aluminium.

With respect to the ions of these metal elements, those which may particularly be mentioned are $Mg^{2+}$, $Ca^{2+}$, $Sr^{2+}$, $Ba^{2+}$, $Al^{3+}$, $Ga^{3+}$, $In^{3+}$, $Sc^{3+}$, $Y^{3+}$, $Te^{4+}$, $Zr^{4+}$, $Cu^{2+}$, $Fe^{3+}$, and $Ln^{3+}$, wherein Ln is the abbreviation for the lanthanoids.

More preferred ions are $Mg^{2+}$, $Ca^{2+}$, $Al^{3+}$, $In^{3+}$, $Y^{3+}$, $La^+$, $Ce^{3+}$, and $Zr^{4+}$. Even more preferred are the ions $Al^{3+}$, and $Zr^{4+}$, in particular $Al^{3+}$.

The metal-organic framework material used in the method for the separation of carbon dioxide according to the present invention comprises at least one at least bidentate organic compound coordinately bound to at least one metal ion.

The at least bidentate organic compound comprises at least one substituted or unsubstituted amino group. More preferred the at least bidentate organic compound comprises one or two amino groups. Preferably the at least one amino group is unsubstituted. Suitable substituents for the amino group are alkyl groups with one to six carbon atoms, e.g. methyl, ethyl, n-propyl, i-propyl, n-butyl, sec-butyl, i-butyl, t-butyl, n-pentyl, n-hexyl.

The term "at least bidentate organic compound" designates an organic compound which comprises at least one functional group which is able to form, to a given metal ion, at least two, preferably three, coordinative bounds, and/or to two or more, preferably three, metal atoms, in each case one coordinative bound. As mentioned before in addition to the at least one functional group the compound comprises at least one substituted or unsubstituted amino functional group.

The functional groups suitable for the coordinative bounds are for example the following functional groups: —$CO_2H$, —$CS_2H$, —$NO_2$, —$B(OH)_2$, —$SO_3H$, —$Si(OH)_3$, —$PO_3H$, and the like. More preferred is —$CO_2H$. The at least one functional group mentioned above which is capable of bidentately coordinate a metal and the at least one substituted or unsubstituted amino group can in principle be bound to any suitable organic compound, provided that it is ensured that the organic compound having these functional groups is capable of forming the coordinative bond and of producing the framework material.

Preferably, the organic compound which comprises the at least one functional group and the at least one substituted or unsubstituted amino group are derived from a saturated or unsaturated aliphatic compound or an aromatic compound or a compound which is both aliphatic and aromatic.

The aliphatic compound or the aliphatic part of the both aliphatic and aromatic compound can be linear and/or branched and/or cyclic, a plurality of cycles also being possible per compound. Further preferably, the aliphatic compound or the aliphatic part of the both aliphatic and also aromatic compound comprises 1 to 15, further preferably 1 to 14, further preferably 1 to 13, further preferably 1 to 12, further preferably 1 to 11, and in particular preferably 1 to 10 carbon atoms, for example 1, 2, 3, 4, 5, 6, 7, 8, 9 or 10 carbon atoms. In particular preference is given here to inter alia methane, adamantane, acetylene, ethylene, or butadiene.

The aromatic compound or the aromatic part of the not only aromatic but also aliphatic compound can have one or else a plurality of nuclei, for example two, three, four or five nuclei, the nuclei being able to be present separately from one another and/or at least two nuclei being able to be present in condensed form. Particularly preferably, the aromatic compound, or the aromatic part of the not only aliphatic but also aromatic compound has one, two or three nuclei, one or two nuclei being particularly preferred. Independently of one another, in addition, each nucleus of said compound can comprise at least one heteroatom, for example N, O, S, B, P, Si, Al, preferably N, O and/or S. Further preferably, the aromatic compound, or the aromatic part of the not only aromatic but also aliphatic compound, comprises one or two $C_6$ nuclei, the two being present either separately from one another or in condensed form. In particular, as aromatic compounds, benzene, naphthalene and/or biphenyl and/or bipyridyl and/or pyridyl may be mentioned.

In a preferred embodiment according to the present invention the at least one at least bidentate organic compound is derived from a di-, tri- or tetracarboxylic acid.

The term "derived" means, in the context of the present invention, that the at least bidentate organic compound can be present in the framework material in particular deprotonated or completely deprotonated form. In addition, the at least bidentate organic compound comprises the at least one substituted or unsubstituted amino group. Furthermore, the term "derived" means that the carboxyl groups, independently of one another, can be present in the form of their sulfur analogs. Sulfur analogs are the functional groups —C(=O)SH and also the tautomer thereof and —C(=S)SH.

Suitable amino dicarboxylic acids which comprise at least one substituted or unsubstituted amino group are those which are derived from the dicarboxylic acids, such as oxalic acid, succinic acid, tartaric acid, 1,4-butanedicarboxylic acid, 4-oxopyran-2,6-dicarboxylic acid, 1,6-hexanedicarboxylic acid, decanedicarboxylic acid, 1,8-heptadecanedicarboxylic acid, 1,9-heptadecanedicarboxylic acid, heptadecanedicarboxylic acid, acetylenedicarboxylic acid, 1,2-benzenedicarboxylic acid, 2,3-pyridinedicarboxylic acid, pyridine-2,3-dicarboxylic acid, 1,3-butadiene-1,4-dicarboxylic acid, 1,4-benzenedicarboxylic acid, p-benzenedicarboxylic acid, imidazole-2,4-dicarboxylic acid, 2-methylquinoline-3,4-dicarboxylic acid, quinoline-2,4-dicarboxylic acid, quinoxaline-2,3-dicarboxylic acid, 6-chloroquinoxaline-2,3-dicarboxylic acid, 4,4'-diaminophenylmethane-3,3'-dicarboxylic acid, quinoline-3,4-dicarboxylic acid, 7-chloro-4-hydroxyquinoline-2,8-dicarboxylic acid, diimidodicarboxylic acid, pyridine-2,6-dicarboxylic acid, 2-methylimidazole-4,5-dicarboxylic acid, thiophene-3,4-dicarboxylic acid, 2-isopropylimidazole-4,5-dicarboxylic acid, tetrahydropyran-4,4-dicarboxylic acid, perylene-3,9-dicarboxylic acid, perylenedicarboxylic acid, Pluriol E 200-dicarboxylic acid, 3,6-dioxaoctanedicarboxylic acid, 3,5-cyclohexadiene-1,2-dicarboxylic acid, octadicarboxylic acid, pentane-3,3-carboxylic acid, 4,4'-diamino-1,1'-diphenyl-3,3'-dicarboxylic acid, 4,4'-diaminodiphenyl-3,3'-dicarboxylic acid, benzidine-3,3'-dicarboxylic acid, 1,4-bis(phenylamino)benzene-2,5-dicarboxylic acid, 1 J'-dinaphthyl-S,S'-dicarboxylic acid, 7-chloro-8-methylquinoline-2,3-dicarboxylic acid, 1-anilinoanthraquinone-2,4'-dicarboxylic acid, poly-tetrahydrofuran-250-dicarboxylic acid, 1,4-bis(carboxymethyl)piperazine-2,3-dicarboxylic acid, 7-chloroquinoline-3,8-dicarboxylic acid, 1-(4-carboxy)phenyl-3-(4-chloro)phenylpyrazoline-4,5-dicarboxylic acid, 1,4,5,6,7,7,-hexachloro-5-norbornene-2,3-dicarboxylic acid, phenylindandicarboxylic acid, 1,3-dibenzyl-2-oxoimidazolidine-4,5-dicarboxylic acid, 1,4-cyclohexanedicarboxylic acid, naphthalene-1,8-dicarboxylic acid, 2-benzoylbenzene-1,3-dicarboxylic acid, 1,3-dibenzyl-2-oxoimidazolidine-4,5-cis-dicarboxylic acid, 2,2'-biquinoline-4,4'-dicarboxylic acid, pyridine-3,4-dicarboxylic acid, 3,6,9-trioxaundecanedicarboxylic acid, O-hydroxybenzophenonedicarboxylic acid, Pluriol E 300-dicarboxylic acid, Pluriol E 400-dicarboxylic acid, Pluriol E 600-dicarboxylic acid, pyrazole-3,4-dicarboxylic acid, 2,3-pyrazinedicarboxylic acid, 5,6-dimethyl-2,3-pyrazinedicarboxylic acid, 4,4'-diaminodiphenyletherdiimidodicarboxylic acid, 4,4'-diaminodiphenylmethanediimidodicarboxylic acid, 4,4'-diaminodiphenylsulfonediimidodicarboxylic acid, 2,6-naphthalenedicarboxylic acid, 1,3-adamantanedicarboxylic acid, 1,8-naphthalenedicarboxylic acid, 2,3-naphthalenedicarboxylic acid, 8-methoxy-2,3-naphthalenedicarboxylic acid, 8-nitro-2,3-naphthalenedicarboxylic acid, 8-sulfo-2,3-naphthalenedicarboxylic acid, anthracene-2,3-dicarboxylic acid, 2',3'-diphenyl-p-terphenyl-4,4"-dicarboxylic acid, diphenylether-4,4'-dicarboxylic acid, imidazole-4,5-dicarboxylic acid, 4(1H)-oxothiochromene-2,8-dicarboxylic acid, 5-tert-butyl-1,3-benzenedicarboxylic acid, 7,8-quinolinedicarboxylic acid, 4,5-imidazoledicarboxylic acid, 4-cyclohexene-1,2-dicarboxylic acid, hexatriacontanedicarboxylic acid, tetradecanedicarboxylic acid, 1,7-heptadicarboxylic acid, 5-hydroxy-1,3-benzenedicarboxylic acid, pyrazine-2,3-dicarboxylic acid, furan-2,5-dicarboxylic acid, 1-nonene-6,9-dicarboxylic acid, eicosenedicarboxylic acid, 4,4'-dihydroxydiphenylmethane-3,3'-dicarboxylic acid, 1-amino-4- methyl-9,10-dioxo-9,10-dihydroanthracene-2,3-dicarboxylic acid, 2,5-pyridinedicarboxylic acid, cyclohexene-2,3-dicarboxylic acid, 2,9-dichlorofluororubin-4,11-dicarboxylic acid, 7-chloro-3-methylquinoline-6,8-dicarboxylic acid, 2,4-dichlorobenzophenone-2',5'-dicarboxylic acid, 1,3-benzenedicarboxylic acid, 2,6-pyridinedicarboxylic acid, 1-methylpyrrole-3,4-dicarboxylic acid, 1-benzyl-1H-pyrrole-3,4-dicarboxylic acid, anthraquinone-1,5-dicarboxylic acid, 3,5-pyrazoledicarboxylic acid, 2-nitrobenzene-1,4-dicarboxylic acid, heptane-1,7-dicarboxylic acid, cyclobutane-1,1-dicarboxylic acid 1,14-tetradecanedicarboxylic acid, 5,6-dehydronorbornane-2,3-dicarboxylic acid or 5-ethyl-2,3-pyridinedicarboxylic acid.

Suitable amino tricarboxylic acids which comprise the at least one substituted or unsubstituted amino group are derived from tricarboxylic acids such as 2-hydroxy-1,2,3-propanetricarboxylic acid, 7-chloro-2,3,8-quinolinetricarboxylic acid, 1,2,4-benzenetricarboxylic acid, 1,2,4-butanetricarboxylic acid, 2-phosphono-1,2,4-butanetricarboxylic acid, 1,3,5-benzenetricarboxylic acid, 1-hydroxy-1,2,3-propanetricarboxylic acid, 4,5-dihydro-4,5-dioxo-1H-pyrrolo[2,3-F]quinoline-2,7,9-tricarboxylic acid, 5-acetyl-3-amino-6-methylbenzene-1,2,4-tricarboxylic acid, 3-amino-5-benzoyl-6-methylbenzene-1,2,4-tricarboxylic acid, 1,2,3-propanetricarboxylic acid or aurintricarboxylic acid.

Suitable amino tetracarboxylic acids which comprise the at least one substituted or unsubstituted amino group are derived from tetracarboxylic acids such as 1,1-dioxidoperylo[1,12-BCD]thiophene-3,4,9,10-tetracarboxylic acid, perylenetetracarboxylic acids such as perylene-3,4,9,10-tetracarboxylic acid or perylene-1,12-sulfone-3,4,9,10-tetracarboxylic acid, butanetetracarboxylic acids such as 1,2,3,4-butanetetracarboxylic acid or meso-1,2,3,4-butanetetracarboxylic acid, decane-2,4,6,8-tetracarboxylic acid, 1,4,7,10,13,16-hexaoxacyclooctadecane-2,3,11,12-tetracarboxylic acid, 1,2,4,5-benzenetetracarboxylic acid, 1,2,11,12-dodecanetetracarboxylic acid, 1,2,5,6-hexanetetracarboxylic acid, 1,2,7,8-octanetetracarboxylic acid, 1,4,5,8-naphthalenetetracarboxylic acid, 1,2,9,10-decanetetracarboxylic acid, benzophenonetetracarboxylic acid, 3,3',4,4'-benzophenonetetracarboxylic acid, tetrahydrofurantetracarboxylic acid or cyclopentanetetracarboxylic acids such as cyclopentane-1,2,3,4-tetracarboxylic acid.

More preferred the at least one substituted or unsubstituted amino group comprising organic compounds is an amino benzene dicarboxylate, a benzene dicarboxylate with two or more amino groups, a naphthalene dicarboxylate with one or more amino groups, aliphatic dicarboxylates, wherein the aliphatic core structure has three to six carbon atoms with one or more amino groups. In particular the at least one at least bidentate organic compound is amino terephthalic acid.

The metal-organic framework material used in the method for the separation of carbon dioxide according to the present invention may comprise more than one at least bidentate organic compound. Furthermore, the metal-organic framework material may comprise several monodentate compounds. Preferably the metal-organic framework material has only one at least bidentate organic compound which constitutes the framework together with the at least one metal ion. In analogy, the metal-organic framework material may comprise more than one metal ion. In case there are more than one metal ions these metal ions may be from the same element but have different oxidation numbers or may be of different elements. It is preferred, that the metal-organic framework material is constituted by only one metal ion.

It is preferred that the porous metal-organic framework material is activated before it is contacted with the gas mixture as part of the least at one sorbent in step (a) of the method for the separation of carbon dioxide according to the present invention.

The activation is typically carried out by heating the framework material in dry and $CO_2$-free atmosphere. Typical temperatures are between 40 to 200° C., preferably between 80 and 150° C.

Another possibility for the activation of the framework material is to subject the material to vacuum. Typical pressure ranges are between 8 and 300 mbar.

It is also possible to use a combination of these methods.

The reduction of the carbon dioxide content in the gas mixture is preferably at least 95% by volume, more preferred at least 99%.

EXAMPLES

Example 1

Preparation of Al-Aminoteriphtelic Acid Framework Material 33.8 g amino terephthalic acid and 90.4 g $AlCl_3 \cdot 6H_2O$ are suspended in 2870 ml N,N-dimethylformamide (DMF) and stirred for 96 hours at 130° C. under reflux. The precipitating product is filtered off and suspended twice in 500 ml DMF and three times in 500 ml methanol each for 15 minutes and again separated off. The resulting product is dried at 50° C. using a hydrogen stream resulting in 62 g of a yellow powder with a specific surface area determined according to Langmuir with nitrogen at 77 K of 878 $m^2/g$.

According to an X-ray diffraction analysis (XRD), the resulting framework material is isostructural to the metal-organic framework material derived from aluminium terephthalate which is known in the literature as "MIL-53".

The resulting powder is shaped in form of cylindrical pills (3×3 mm) adding 1 wt. % of graphite. The specific surface area according to Langmuir with nitrogen at 77 K is determined as being 330 $m^2/g$.

Example 2

Adsorption Isotherms of Pure Gases

The adsorption isotherms of the gases carbon dioxide, carbon monoxide and methane are determined by different temperatures using the metal-organic framework material according to example 1 as shaped bodies with the aid of a magnetic suspension balance (Rubotherm Präzissionstechnik GmbH, Bochum, Germany). FIG. 1 shows the isotherms of carbon dioxide in comparison with carbon monoxide where the adsorbed amounts of the respective gas (mg gas/g sorbents) A is shown as a function of the pressure (mbar, absolute) p and wherein
graph 1 is $CO_2$ at 21° C.,
graph 2 is $CO_2$ at 42° C.,
graph 3 is $CO_2$ at 61° C.,
graph 4 is CO at 23° C. (right y-axis),
graph 5 is CO at 40° C. (right y-axis),
graph 6 is CO at 61° C. (right y-axis).

Figure 2:
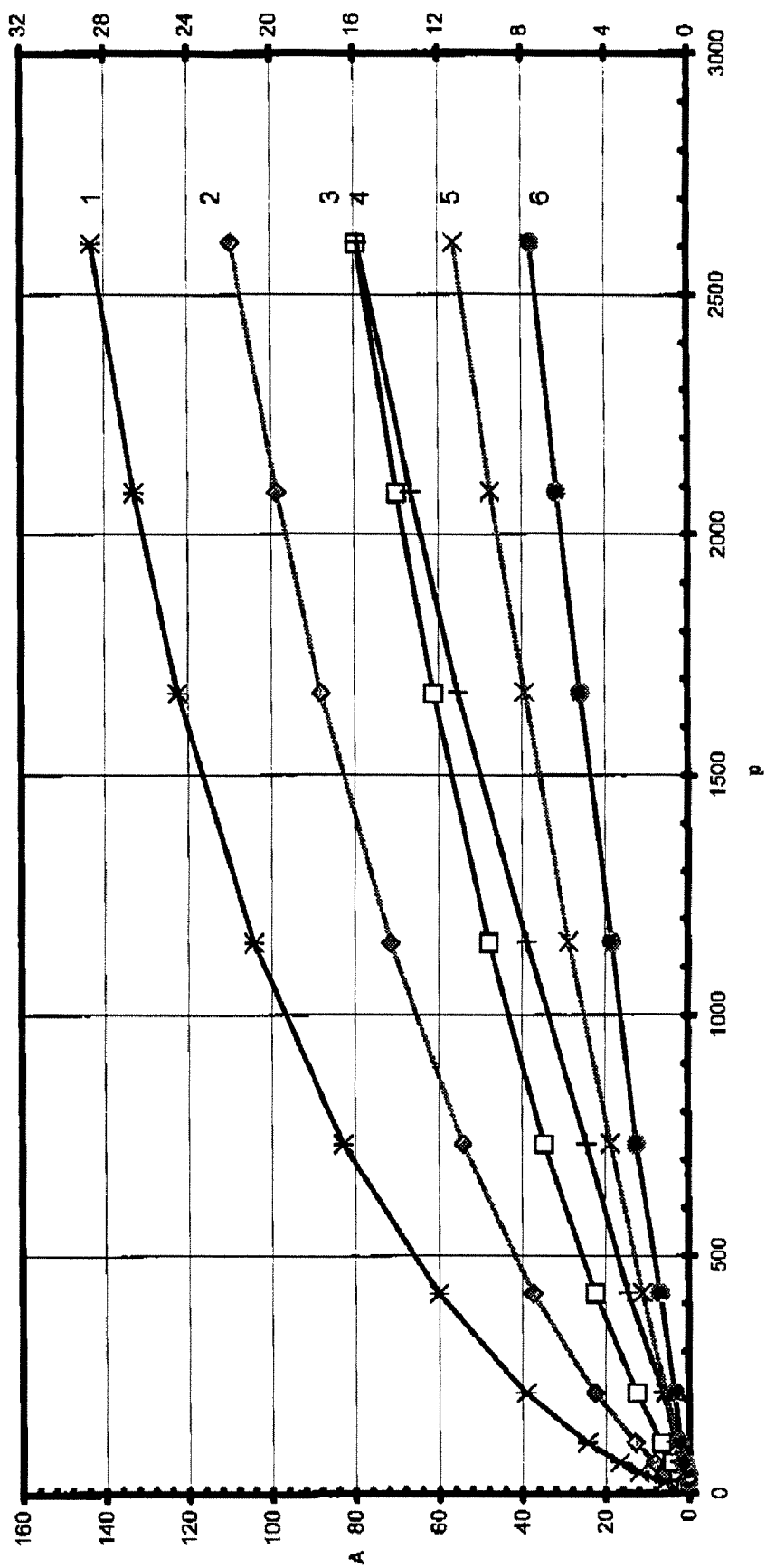
FIG. 2: adsorption isotherms carbon dioxide and methane.

The same applies for FIG. 2 where the adsorption isotherms of carbon dioxide and methane are shown and wherein
graph 1 is $CO_2$ at 21° C.,
graph 2 is $CO_2$ at 42° C.,
graph 3 is $CO_2$ at 61° C., graph 4 is methane at 20° C. (right y-axis),
graph 5 is methane at 41° C. (right y-axis),
graph 6 is methane at 60° C. (right y-axis).

As can be seen from FIGS. 1 and 2 there is in principle a possibility to separate carbon dioxide from a gas mixture additionally containing carbon monoxide and/or methane. Compared to the adsorption isotherms of the framework material "MIL-53" the adsorption isotherm of the amino analog shows a higher degree of carbon dioxide adsorption at high partial pressures for carbon dioxide and better selectivities, especially for partial pressures of carbon dioxide of at least 1,500 mbar.

Example 3

Separation of a $CO_2$-/$CH_4$-Model Gas Mixture 38 g of the framework material according to example 1 in the form of shaped bodies is introduced in a tubular reactor having a double-wall jacket to control the temperature of the reactor. The framework material is activated using a hot stream of nitrogen. Initially a stream of pure methane with a pressure of 5 to 20 bar (absolute) is used to condition the reactor. Subsequently, a stream of a gas mixture of methane containing 5 vol.-percent of carbon dioxide is introduced with a rate of 100 to 250 l (S.T.P.)/h. The composition of the reactor exhaust gas is detected by a gas chromatograph. At the beginning only pure methane is detected. The experiment is stopped after carbon dioxide is detected by the gas chromatograph.

Figure 3:
FIG. 3: carbon dioxide capacity as a function of partial pressure of carbon dioxide for aluminium amino terephthalate.

FIG. 3 shows the carbon dioxide capacity (weight percent) C at 20° C. as a function of the partial pressure of carbon dioxide (bar) p for the aluminium amino terephthalate according to example 1 (upper graph) in comparison to the metal-organic framework "MIL-53" (lower graph). As it can be seen from FIG. 3 the carbon dioxide capacity of the amino derivative is quite higher than for the metal-organic framework material in which the organic compound does not comprise an amino functional group.

The invention claimed is:

1. A method for the separation of carbon dioxide from a gas mixture containing carbon dioxide comprising the steps of
   (a) contacting the gas mixture with at least one sorbent comprising a porous metal-organic framework material, the framework material taking up the carbon dioxide from the gas mixture and comprising at least one at least bidentate organic compound coordinately bound to at least one metal ion, wherein the at least bidentate organic compound comprises at least one substituted or unsubstituted amino group and wherein the at last one metal ion is an ion selected from the group of metals consisting of magnesium, calcium, strontium, barium, aluminium, gallium, indium, scandium, yttrium, titanium, zirconium, iron, copper, and lanthanoids; and
   (b) desorbing the carbon dioxide.

2. The method of claim 1, wherein the gas mixture contains in addition to carbon dioxide at least one gas selected from the group consisting of methane, ethane, n-butane, i-butane, hydrogen, carbon monoxide, ethene, ethyne, propene, nitrogen, oxygen, helium, neon, argon, krypton, and hydrogen sulfide.

3. The method of claim 2, wherein the gas mixture contains at least two additional gases.

4. The method of claim 1, wherein the gas mixture is selected from the group consisting of natural gas, fuel gas, bio gas, town gas, waste gas, flue gas, and air.

5. The method of claim 1, wherein the metal is selected from the group consisting of magnesium, calcium, aluminium, indium, yttrium, lanthanum, cerium, and zirconium.

6. The method of claim 1, wherein the at least one at least bidentate organic compound comprises one or two amino groups.

7. The method of claim 1, wherein the at least one amino group is unsubstituted.

8. The method of claim 1, wherein the at least one at least bidentate organic compound is derived from a di-, tri- or tetracarboxylic acid.

9. The method of claim 1, wherein the at least one at least bidentate organic compound is amino terephthalic acid.

10. The method of claim 1, wherein the porous metal-organic framework material is in the form of a powder.

11. The method of claim 10, wherein the powder has a specific surface of at least 450 $m^2$/g determined according to Langmuir with nitrogen at 77 K.

12. The method of claim 1, wherein the porous metal-organic framework material is in the form of a shaped body.

13. The method of claim 12, wherein the shaped body has a specific surface of at least 250 $m^2$/g determined according to Langmuir with nitrogen at 77 K.

14. The method of claim 1, wherein step (a) is carried out with a temperature of from 0° C. to 100° C.

15. The method of claim 1, wherein the partial pressure of carbon dioxide is from 0.1 to 20 bar.

16. The method of claim 1, wherein the steps (a) and (b) a carried out under pressure swing adsorption, temperature swing adsorption or both.

17. The method of claim 1, wherein before step (a) the porous metal-organic framework material is activated.

18. The method of claim 17, wherein the framework material is activated by subjecting the material to temperature, vacuum or both.

19. The method of claim 1, wherein before step (a) the gas mixture is subject to dehumidification.

20. The method of claim 19, wherein the gas mixture after dehumidification has a water content of less than 5000 ppm.

* * * * *